Oct. 13, 1931.  E. B. WEEKS  1,827,498
POLE CARRIER ATTACHMENT FOR VEHICLES
Filed Aug. 29, 1929    2 Sheets-Sheet 1
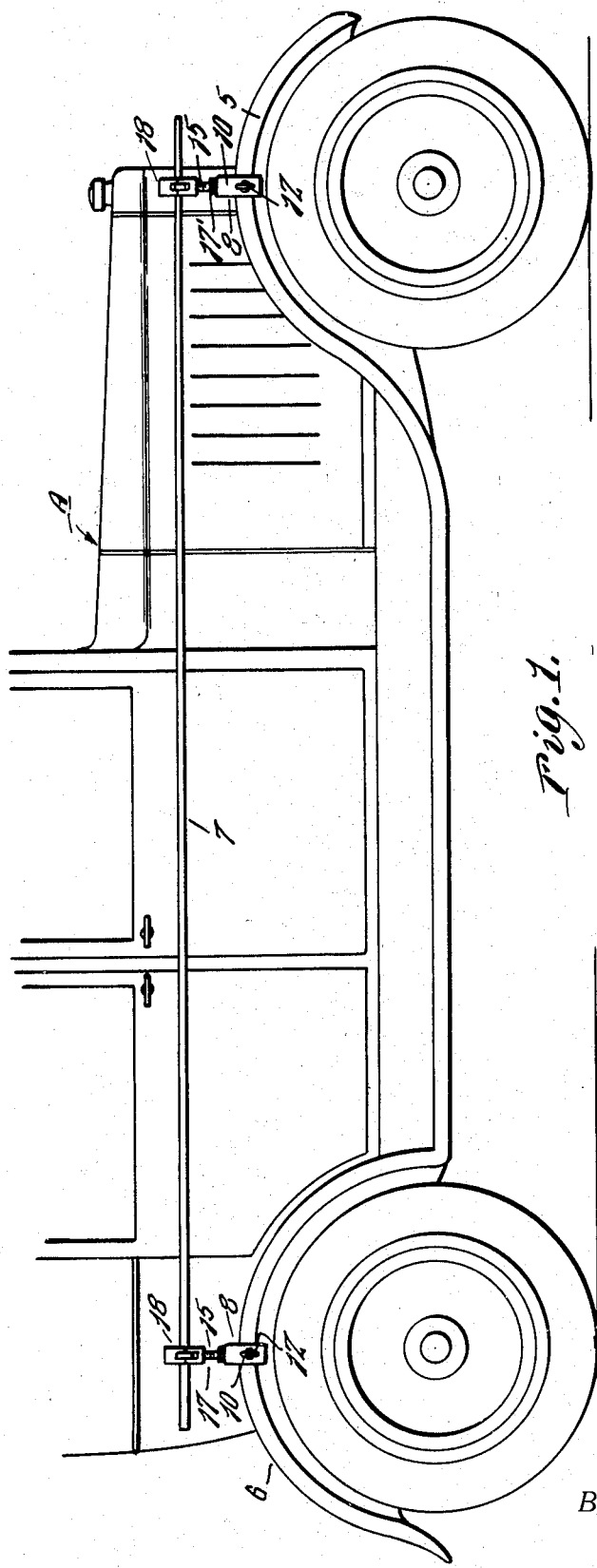
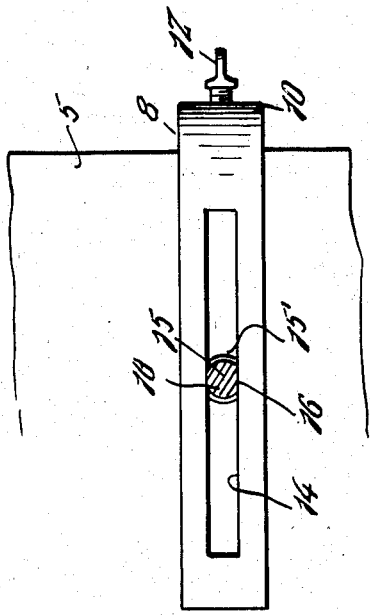
Inventor
Ernest B. Weeks
By Clarence A. O'Brien
Attorney

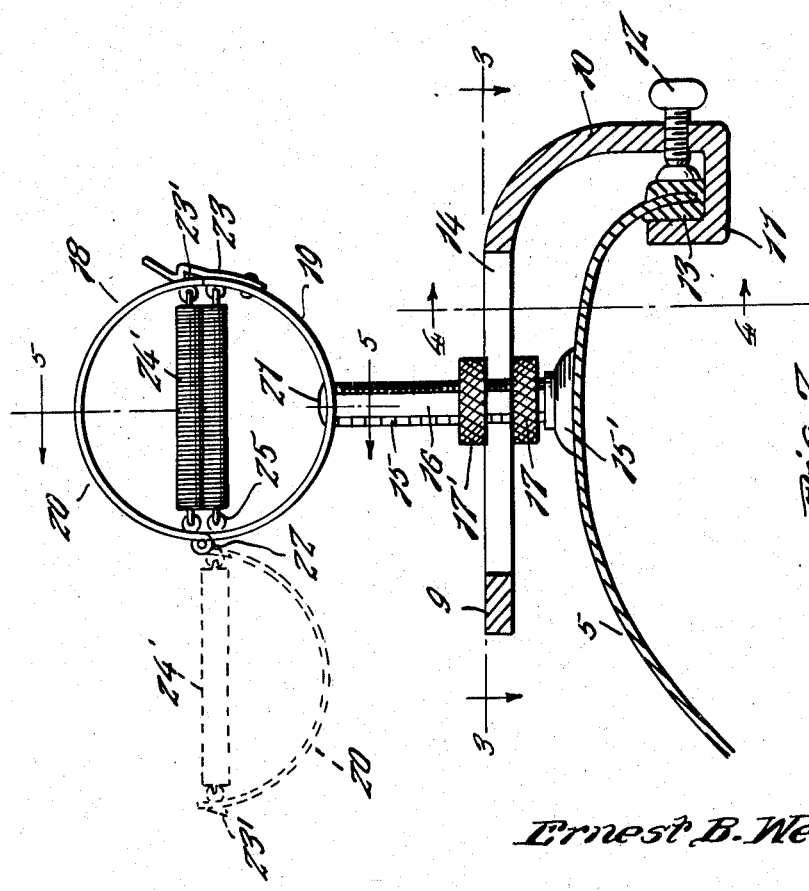

Patented Oct. 13, 1931

1,827,498

UNITED STATES PATENT OFFICE

ERNEST B. WEEKS, OF BILOXI, MISSISSIPPI

POLE CARRIER ATTACHMENT FOR VEHICLES

Application filed August 29, 1929. Serial No. 389,249.

This invention relates to what may be broadly termed a clamp and has more particular reference to the provision of an improved clamp adapted to be used in conjunction with vehicles, whereby poles, rods or the like may be secured in a horizontal position upon the vehicle.

Another very important object of this invention is to provide an improved clamp of the above mentioned character which may be readily and easily affixed to the fender of the vehicle, the invention comprehending the utilization of a pair of such clamps to be hereinafter more fully described, adapted to be attached to the front and rear fenders of the vehicle, whereby poles, fishing rods and the like may be securely clamped in position upon the vehicle, when transporting said poles and the like from place to place.

Another salient feature of this invention is the provision of a pole carrying clamp for vehicles which may be readily and easily fixed to the vehicle and as easily removed therefrom without in any way altering and damaging the vehicle, thus rendering the clamp especially adapted for passenger carrying vehicles, such as touring cars, closed automobiles and the like.

Another very important object of the invention is to provide a clamp of the above mentioned character which is simple in construction, economical, strong, durable, positive in operation, thoroughly reliable, practical, efficient and otherwise well adapted for the purpose designed.

Other objects and advantages of this invention will become apparent during a study of the following description, taken in connection with the accompanying drawings, wherein:

Figure 1 is a side elevation of a vehicle equipped with my improved pole carrying clamp.

Figure 2 is a view partly in section and partly in elevation, illustrating in detail, the manner of affixing the clamp to the fender.

Figure 3 is a horizontal sectional view, taken substantially on the line 3—3 of Figure 2 and looking in the direction of the arrows.

Figure 4 is a vertical sectional view, taken substantially on the line 4—4 and looking in the direction of the arrows.

Figure 5 is a detail sectional view, taken substantially on the line 5—5 of Figure 2.

With reference more in detail to the drawings wherein for the sake of exemplification, there is illustrated the preferred form of my clamp, it will be seen that the reference character A designates generally a vehicle of conventional construction, the same being an automobile, said automobile being equipped and embodying among other parts, front fenders 5 and rear fenders 6.

As illustrated in the drawings, my invention comprehends the provision of a clamp adapted to be fixed to each of said fenders, the clamps on the respective sides of the vehicle supporting a rod, such as is designated at 7 said rods being in the nature of a pole, a fishing rod or the like, the opposite ends of the rods being engaged with my improved clamp to be hereinafter more fully described. As illustrated my improved clamp comprises a hook-like member designated generally by the reference character 8, the same comprising an elongated shank 9 curved at one end as at 10, said curved portion terminating in a hook 11. The attaching hook 8 has screw threadedly engaged therewith at the curved portion 10 thereof and adjacent the hooked portion 11, a thumb screw 12, which cooperates with the hook portion for maintaining the attaching hooks in position upon the fender. As shown to advantage in Figure 2, the hook portion 11 of the attaching member engages the lower edge of the outer flange of the fender, and the thumb screw 12 is then screwed into binding engagement with the flange of the fender as illustrated for maintaining the hooks in said position upon the fender, the shank portion 9 of the hook extending transversely of the fender and disposed in spaced relation to the top surface of the fender. In order to avoid scratching the fender, in any way, I provide a guard 13, said guard 13 being formed of any suitable material but preferably rubber, and as shown in Figure 2, this guard is substantially U-shaped to receive the flange of the fender between the legs thereof, one leg of the guard being disposed between the inner face of the flange and the hook 11, the other leg of the guard being bowed on the outer face of the flange, the thumb screw 12 having its inner ends pressing against this leg of the guard, the thumb screw 12 being screw threadedly engaged with the member 8 and as shown will, of course, produce a binding action upon the guard, thus maintaining the same in position, and at the same time maintaining the member 8 also in position. The attaching member 8 has formed on the shank portion 9 thereof an elongated longitudinally extended slot 14. A clamp carrying shank or stem 15 has one end thereof extending through the slot 14, said stem 15 extending at right angles with the respect to the shank and at its lower end the stem 15 is provided with a rubber base 15' adapted to rest on the upper surface of the body of the fender.

On diametrically opposite sides the shank 15 is flattened as at 16, so as to permit the slidable movement of the shank longitudinally of the slot 14. The opposite surfaces of the shank is threaded for threaded engagement with a knurled finger nut 17 which is threadedly disposed upon the shank adjacent the base 15' of the shank, for disposition at the under face of the shank 9 of the attaching member 8. A second knurled finger actuated nut 17' is threadedly engaged with the stem 15 and is adapted to rest upon the upper face of the shank 9. Thus it will be seen that the shank 9 is positioned between the upper and lower knurled finger actuated nuts 17 and 17', with the result that when the knurled nut 17' is threaded axially of the stem 15, downwardly of the stem, the same will bind against the upper face of the shank 9 and thus in this manner cooperate with the lower nut 17 for maintaining the stem 15 in an adjusted position within the slot.

Affixed to the upper end of the stem 15, in a manner to be hereinafter more fully set forth is a substantially circular clamping member designated generally by the reference character 18. This clamping element 18 comprises a pair of semi-circular complemental sections 19 and 20 respectively. The lower clamping member is fixed intermediate its ends in any suitable manner such as illustrated or designated by the reference character 21, to the upper end of the stem 15, and extends upwardly from the stem as is apparent.

The upper complemental semi-circular clamping section 20 has one end thereof hingedly associated with one end of the lower clamp section 19 as at 22. The opposite end of the upper clamp section 20 is adapted to rest on the other end of the lower clamp section 19. At this last mentioned end, the lower clamp member 19 is provided with a spring snap catch member 23, anchored thereto and engageable with an abutment 23' provided on the adjacent or abutting end of the clamp section 20. Thus the sections may be maintained in closed or locked engagement. Each of the clamp sections 19 and 20 respectively have their respective ends connected through the medium of a coil spring 24 and 24' respectively. As shown, each of the said coil springs are anchored to the end of their respective members in any suitable manner such as designated generally by the reference character 25. As is obvious the springs 24 and 24' when the clamp sections are closed so as to define a circle, extend through the diameter of the circle in parallelism to one another.

Thus it will be seen that when I employ a clamp of this nature, one to the front and rear fender respectively, a rod, such as herein designated may have one end thereof clamped between the cooperating springs of one of the members or clamps and the opposite ends of the rod disposed between the frame of the clamp on the front or rear fender as the case may be, the rods then assuming the position as shown in Figure 1, that is, in a substantially horizontal position and extending from front to rear of the automobile, it being of course understood that these clamps may be used at both sides of the vehicle and on the rear and front fenders respectively, so that poles or rods may be carried on opposite sides of the vehicle.

It is also to be further understood and as is apparent the diameter of the circular clamp will be such as to utilize springs of suitable length, whereby any number of poles within reason may have their ends clamped between the springs of the respective clamping members.

Thus it will be seen that I have provided a very novel, simple, yet strong, practical and efficient pole clamp for attachment to the fenders of vehicles whereby one may conveniently carry rods or poles, such as fishing poles or the like, exteriorly of the vehicle and without inconvenience to the occupant.

Even though I have herein shown and described the preferred embodiment of my invention it is to be understood that the same is susceptible to changes fully comprehended by the spirit of the invention and the scope of the appended claims.

What is claimed is:

1. In a clamp of the class described, a pair of clamping sections, means for hingedly securing said sections to each other at one end, the opposite ends of said sections adapted to be disposed in abutting relation when said sections are in a clamping position, a resilient member carried by each of said sections, said resilient members adapted to cooperate with one another for bindingly receiving therebetween the member to be clamped when said clamp sections are in a closed clamping position.

2. In a clamp of the class described, a pair of substantially semi-circular clamping sections, means for hingedly securing said sections to each other at one end, the opposite ends of said sections adapted to be disposed in abutting relation when said sections are in a clamping position, a resilient member carried by each of said sections, said resilient members adapted to cooperate with one another for bindingly receiving therebetween the member to be clamped when said clamp sections are in a closed clamping position, a stem carried by one of said clamping sections, and means slidably engaged with said stem for securing said stem to a support.

3. In combination with a vehicle, wherein said vehicle embodies a front and rear fender, of means for supporting a rod arranged in a horizontal position longitudinally of the vehicle, said means comprising a pair of clamps, each of said clamps embodying a hooked member adapted to engage with one of said fenders, a stem slidably engaged with the shank of the hook member, the lower end of said stem adapted to rest upon the fender, and a clamping element carried by said stem at the upper end of said stem, said clamping element adapted to engage one end of the rod to be supported thereby.

4. In combination with a vehicle, wherein said vehicle comprises a front and rear fender, means for supporting a horizontally disposed rod longitudinally of the vehicle, said means comprising a pair of clamping members one for each of said fenders, each of said clamping members comprising a hook member adapted to be detachably engaged with its particular fender, a vertically disposed stem slidably engaged with the shank of said hook member, said stem having one end thereof adapted for rest upon the fender, and a pair of hingedly connected clamping sections, supported by the other end of the stem, one of said sections being fixed to the upper end of the stem, and each of said sections embodying a spring secured to and connecting the ends of its particular section, and the spring of each section adapted to cooperate with the spring of the other section for bindingly receiving therebetween one end of the rod to be supported thereby, when said clamping sections are disposed in clamping position.

5. A clamp of the character described, having in combination, a support engaging hook including a slotted shank, a stem extending through the slot at right angles to said shank, supporting means on one end of the stem, clamping nuts threaded on the stem engaging said shank, the free end of the stem abutting the support.

6. A clamp of the character described, having in combination, a support engaging hook including a slotted shank, a stem extending through the slot at right angles to said shank, supporting means on one end of the stem, clamping nuts threaded on the stem engaging said shank, the free end of the stem abutting the support, for retaining the shank of the hook in spaced relation to the support, and a thumb screw threaded through the bill of the hook for engaging an adjacent portion of the support, to retain said hook in engagement with the support.

In testimony whereof I affix my signature.

ERNEST B. WEEKS.